Figure 1:
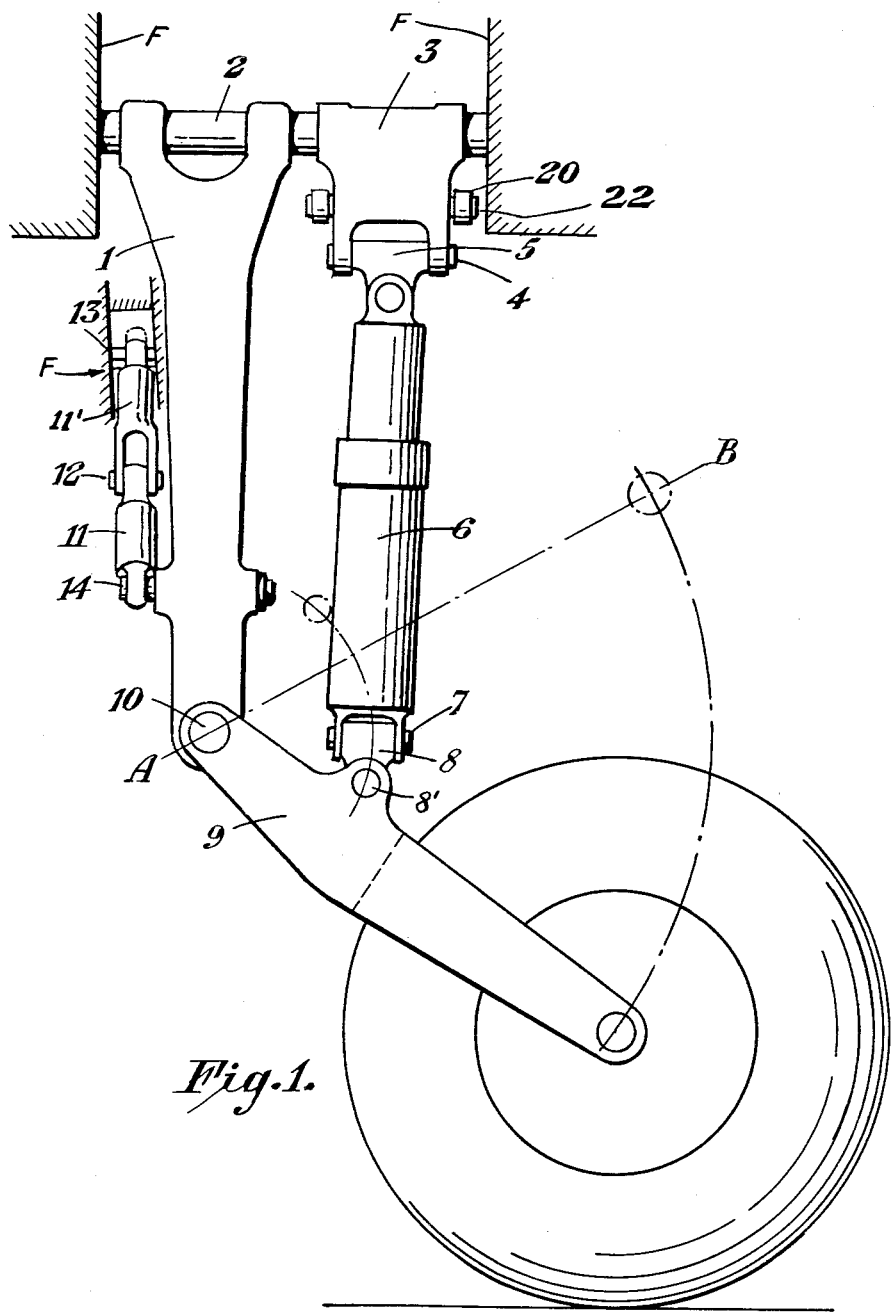

March 14, 1961     J. PERDUE     2,974,909
RETRACTABLE LANDING GEAR FOR AIRCRAFT
Filed Oct. 26, 1956     3 Sheets-Sheet 1

Inventor:
Jack Perdue
By his attorneys:
Baldwin & Wight

March 14, 1961  J. PERDUE  2,974,909
RETRACTABLE LANDING GEAR FOR AIRCRAFT
Filed Oct. 26, 1956  3 Sheets-Sheet 2

Inventor:
Jack Perdue
By his attorney:
Baldwin & Wight

March 14, 1961 J. PERDUE 2,974,909
RETRACTABLE LANDING GEAR FOR AIRCRAFT
Filed Oct. 26, 1956 3 Sheets-Sheet 3

Inventor:
Jack Perdue
By his attorneys:
Baldwin & Wight

United States Patent Office 2,974,909
Patented Mar. 14, 1961

2,974,909

RETRACTABLE LANDING GEAR FOR AIRCRAFT

Jack Perdue, Great Sankey, Warrington, England, assignor to Electro-Hydraulics Limited, Warrington, England, a company of Great Britain Filed Oct. 26, 1956, Ser. No. 618,579

Claims priority, application Great Britain Nov. 29, 1955

3 Claims. (Cl. 244—102)

This invention relates to retractable landing gear for aircraft and deals with a levered suspension type of landing gear which is retractable sideways.

When designing retractable landing gear of this type, difficulty is encountered in finding adequate stowage space for the undercarriage in the retracted position. It is known to alter the relative articulated position of the undercarriage members during retraction by lever or connecting members having on end pivoted at a fixed point relative to the undercarriage structure, but this method entails a geometrical layout of the undercarriage which requires a considerable stowage space and in the lowered position introduces undesirable side loads on the undercarriage members due to ground reaction on the ground contacting elements.

Aircraft retractable landing gear of the levered suspension type, according to the present invention comprises an undercarriage structure including ground contacting elements, a shock absorber, including a retraction bracket, said undercarriage structure and retraction bracket being pivotally mounted on a common pivot member, and means which, on retraction of the landing gear, causes the undercarriage structure and the retraction bracket, in conjunction with the shock absorber, to swing in opposite directions, whereby the articulated position of the ground contacting elements, relative to the undercarriage structure, is altered to shorten the over-all length of the said undercarriage structure.

Preferably the suspension of the undercarriage structure and retraction bracket with its associated shock absorber on the common pivot member is so arranged that the pivot points of the landing gear are co-linear in a vertical plane, so that undesirable side loads on the structure, due to ground reaction, are minimised or eliminated.

Preferably the undercarriage structure includes a strut to the lower end of which is hinged a beam, the other end of which has mounted thereon the ground contacting elements, such as wheels, whilst the shock absorber is mounted on a universal joint pivotally connected to the retraction bracket at the upper end of the shock absorber, whilst at the lower end it is connected through a universal joint to the beam.

The means for swinging the undercarriage structure and the retraction bracket preferably comprises a folding bracing member pivoted at one end to the aircraft structure and at the other to the strut, the folding of the bracing member being caused by a fluid pressure operated jack, extension of which causes folding of the bracing member to rotate the undercarriage strut in one direction, rotation of the retraction bracket in the opposite direction being obtained through a pivotal coupling between the undercarriage strut and the said bracket.

Figure 2:
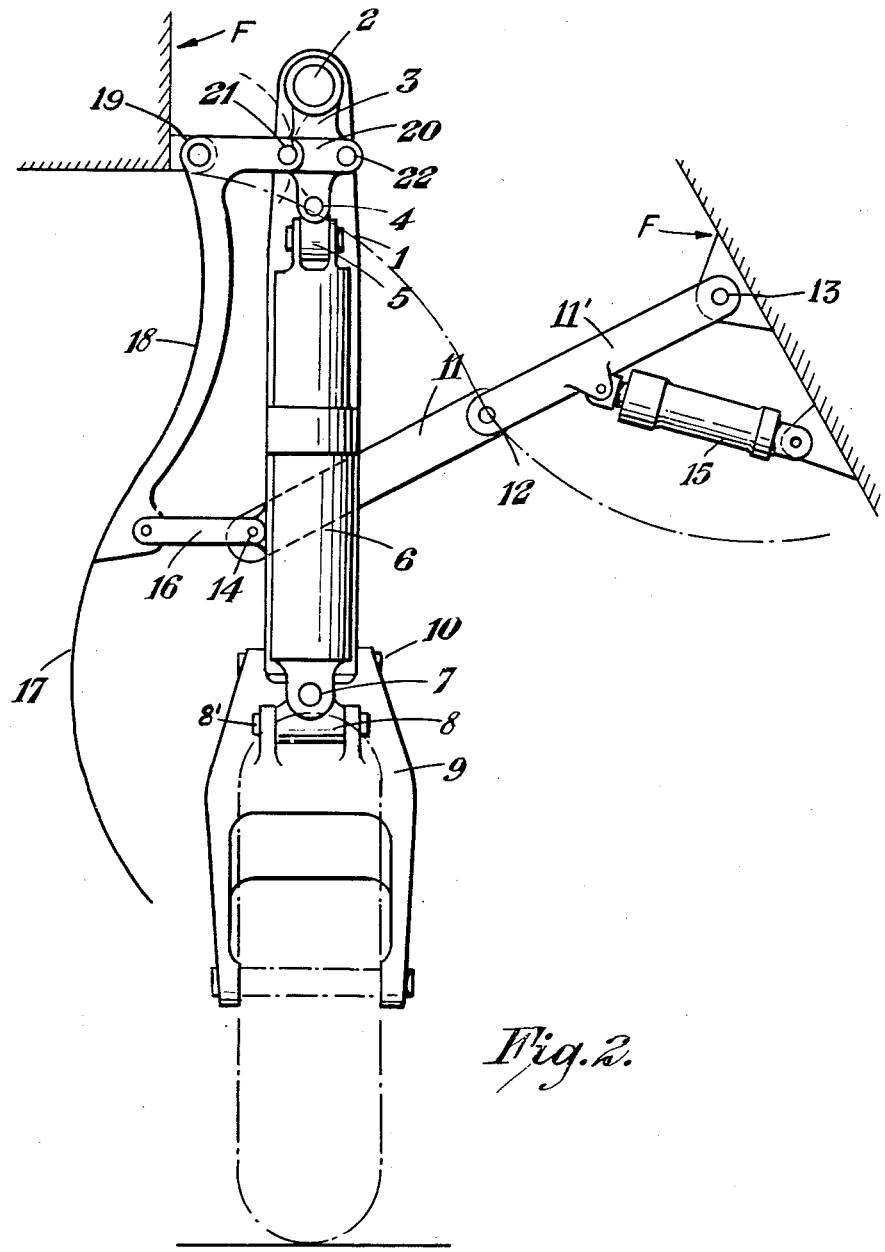
Figure 3:
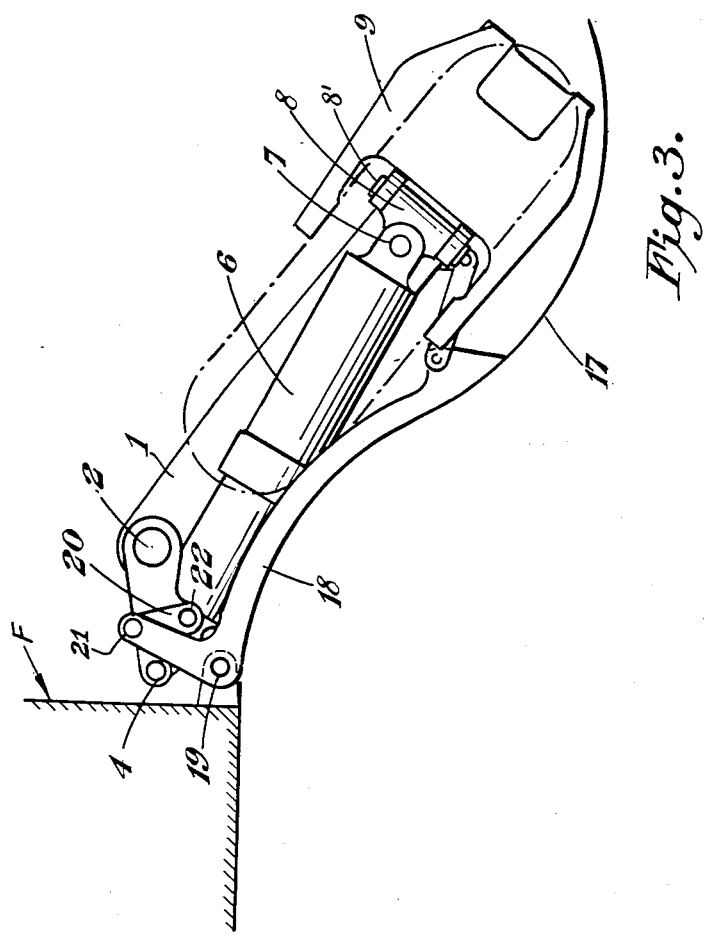

One form of aircraft retractable landing gear according to the present invention is illustrated to in the accompanying drawings, in which the landing gear is shown in extended position in side and front elevation respectively in Figures 1 and 2, and in the retracted position in Figure 3.

Referring to the drawings, which diagrammatically show fixed frame structure F, landing gear is illustrated as including undercarriage strut 1 pivotally mounted on a fixed pivot member 2 of the aircraft, on which is also pivotally mounted a retraction lever or bracket 3 carrying on a pivot 4 a universal joint 5 connected to the upper end of a shock absorber 6, the lower end of which is pivoted through a pivot 7 and universal joint 8 and pivot 8' to a beam 9. The axis of the pivot 4 is offset from the axis of the fixed pivot 2, and therefore is swingable arcuately about the fixed pivot axis when the retraction lever 3 is rocked about the fixed pivot axis. This beam is hinged at 10 to the lower end of the undercarriage strut 1, and at its other end carries the ground contacting elements, such as pneumatic tyre wheels, the hinge 10 being provided by a pivot the axis of which is normal to the axis of the pivot member 2. The undercarriage strut 1 is braced to the aircraft by foldable bracing members 11 and 11' hinged at 12 and pivotally mounted to the aircraft structure at 13 and to the undercarriage strut at 14. The bracing member 11 is folded for retraction purposes by a fluid pressure operated jack 15 having a known internal locking means (not shown) for locking the parts in the closed position, thereby locking the strut in the extended position when the undercarriage is lowered.

On the pivot 14 is a pivotal link 16 coupled to the undercarriage compartment door 17, strengthened by a beam 18 which is hinged to the aircraft structure at 19 which is the hinge for the door 17, the link 16 thus constraining the door 17 and its associated parts to move with the undercarriage strut 1. An extension of the door beam 18 carries a link 20 pivotally attaching the door beam 18 to the retraction lever or bracket 3 through pivots 21 and 22 respectively.

When the landing gear is in the position shown in Figure 3, that is to say the retracted position, the undercarriage is locked by an external up-lock mechanism, not shown.

When the aircraft is airborne and the undercarriage is in the fully lowered position as shown in Figures 1 and 2 with the strut 1 extending downwardly, the shock absorber 6 is maintained fully extended, due to the weight of the beam 9 and the ground contacting elements, and also due to the action of the shock absorber air spring.

When it is desired to retract the undercarriage, the fluid pressure operated jack 15 included in the operating means for rocking the strut is pressurised on its full area side, automatically releasing the internal down-lock mechanism. Extension of the jack rocks the bracing member 11' clockwise about its pivot 13 and folds the bracing members 11 and 11' at joint 12, thereby rotating the undercarriage strut 1 together with the beam 9 and ground contacting elements about pivot 2 in an anticlockwise direction when viewed in Figures 2 and 3 to an inclined and more nearly horizontal position shown in Figure 3. Through link 16 the compartment door 17 is simultaneously rotated anticlockwise about hinge 19 causing, by means of link 20, rotation of the retraction bracket 3 in a clockwise direction about pivot 2. Whilst the undercarriage strut 1 is moved into the retracted position as shown in Figure 3, the rotation of the retraction bracket 3 about the pivot 2 by means of the arm on the beam 18 in the opposite direction relative to the strut 1 causes, through its connection at 4, a lifting force to be transmitted through the shock absorber 6 as a connecting member in its extended position, to the beam 9, and thus rocks the beam 9 about the pivot 10 to a position relative to the undercarriage strut shown as a broken line in Figure 1 as A—B. Thus, rocking of the beam 9 about the pivot 10 is in a plane normal to the plane in which the strut 1 rocks about the fixed pivot member 2. In this position the undercarriage having reached the full retraction, is locked by means of a lock mechanism (not shown), for example bolts on the door frame.

On lowering the undercarriage, the reverse of the above sequence occurs. The undercarriage up-lock mechanism is released, the fluid operated jack 15 is pressurized on its annular side, and retraction of the jack extends the bracing member 11, thereby moving the undercarriage strut into the lowered position. Simultaneously by means of the door beam 18 and links 16 and 20 the retraction bracket 3 is moved into the lowered position, as shown in Figure 2, during which movement by utilising the shock absorber 6 as a connecting member, the beam 9 is lowered from the relative position A—B to the fully lowered position, as shown in Figure 1. In this position the bracing member 11 is locked in its fully extended position, holding the undercarriage in its fully lowered position, by internal automatic locking means in the fluid operated jack. In this lowered position the wheel, the beam 9, the shock absorber 6, the undercarriage strut 1 and the retraction link 3 lie with their axes substantially in the same vertical plane so that no excessive loads are placed on the associated linkage due to ground reaction.

What is claimed is:

1. In retractable aircraft landing gear of the levered suspension type, a fixed pivot member; an undercarriage strut mounted to rock on said pivot member; an undercarriage beam; means pivotally connecting said beam to said strut to rock relatively to said strut about an axis normal to the axis of said fixed pivot member; a ground engaging member on said beam; a shock absorber pivotally connected to said beam; a retraction lever mounted to rock about the axis of said fixed pivot member; means pivotally connecting said shock absorber to said retraction lever at a second pivot axis offset from the axis of said fixed pivot member, said second pivot axis being swingable arcuately about the axis of said fixed pivot member when said retraction lever is rocked about the axis of said fixed pivot member; operating means for rocking said strut about the axis of said fixed pivot member in one direction from a lowered and extended position in which said strut extends downwardly from said fixed pivot member to a retracted position in which said strut extends more nearly horizontally; and means connected to said retraction lever and to said strut and being operable by rocking of said strut from its lowered position to its retracted position for rocking said retraction lever in the opposite direction about the axis of said fixed pivot member whereby to transmit force through said shock absorber to rock said beam about the axis of its pivotal connection to said strut from an extended position with respect to said strut to a retracted position with respect thereto, the rocking of said beam about its pivotal connection to said strut being in a plane normal to the plane in which said strut rocks about said fixed pivot member, and the distance between said fixed pivot member and the connection of said ground engaging member with said beam being greater in the extended position of said strut than in the retracted position thereof.

2. Aircraft landing gear construciton as set forth in claim 1 in which said operating means for rocking said strut comprises a foldable bracing member; fixed means pivotally mounting one end of said bracing member; means pivotally connecting the other end of said bracing member to said strut; and a fluid pressure operated jack for causing folding of said bracing member and consequent rocking of said strut.

3. Aircraft landing gear construction as set forth in claim 1 in which the pivotal connections of said strut and said retraction lever to said fixed pivot member are substantially normal to the pivotal connection of said beam to said strut, and the pivotal connections of said shock absorber to said retraction lever and to said beam, all of said pivotal connections being substantially in the same vertical plane when said strut is in its extended position.

References Cited in the file of this patent

FOREIGN PATENTS

| | | |
|---|---|---|
| 527,110 | Great Britain | Oct. 2, 1940 |
| 1,111,782 | France | Nov. 2, 1955 |